(12) United States Patent
Sparkman

(10) Patent No.: US 12,464,094 B1
(45) Date of Patent: Nov. 4, 2025

(54) SYSTEM AND METHOD FOR ON-DEMAND DRONE SURVEILLANCE AND EMERGENCY RESPONSE

(71) Applicant: Gregory A. Sparkman, Southlake, TX (US)

(72) Inventor: Gregory A. Sparkman, Southlake, TX (US)

( * ) Notice: Subject to any disclaimer, the term of this patent is extended or adjusted under 35 U.S.C. 154(b) by 91 days.

(21) Appl. No.: 18/367,848

(22) Filed: Sep. 13, 2023

Related U.S. Application Data

(60) Provisional application No. 63/470,093, filed on May 31, 2023.

(51) Int. Cl.
| | | |
|---|---|---|
| *H04N 7/18* | (2006.01) | |
| *G06Q 10/0631* | (2023.01) | |
| *H04W 4/029* | (2018.01) | |
| *G06Q 10/00* | (2023.01) | |

(52) U.S. Cl.
CPC ....... *H04N 7/185* (2013.01); *G06Q 10/06315* (2013.01); *H04W 4/029* (2018.02)

(58) Field of Classification Search
CPC ...... H04N 7/185; H04N 7/18; G06Q 10/0833; G06Q 10/00; G06Q 10/02
USPC ............................ 348/61, 73, 169, 180, 184
See application file for complete search history.

(56) References Cited

U.S. PATENT DOCUMENTS

| | | | |
|---|---|---|---|
| 11,748,901 B1 * | 9/2023 | Knuffman | G06T 7/579 345/419 |
| 2017/0261604 A1 * | 9/2017 | Van Voorst | G06V 20/13 |
| 2018/0349831 A1 * | 12/2018 | Harris | G06Q 10/063118 |
| 2019/0103030 A1 * | 4/2019 | Banga | G01S 5/0027 |
| 2019/0172357 A1 * | 6/2019 | Meuleman | H04W 4/029 |

\* cited by examiner

*Primary Examiner* — Daquan Zhao
(74) *Attorney, Agent, or Firm* — Richard Eldredge; Leavitt Eldredge Law Firm

(57) ABSTRACT

In a system and method for on-demand drone surveillance and emergency response, a software application receives a service request from a user device. A server processes the request and determines available drone pilots based on geographical proximity to the user. A selected drone pilot operates a drone equipped with video recording capabilities to the service location. The drone records a video feed at the service location, which is transmitted via a communication interface and displayed through the software application on the user device. The system provides real-time, on-demand surveillance and emergency response, potentially enhancing safety and security in various situations.

5 Claims, 3 Drawing Sheets

SYSTEM AND METHOD FOR ON-DEMAND DRONE SURVEILLANCE AND EMERGENCY RESPONSE

BACKGROUND

1. Field of the Invention

The present invention relates generally to drone technology systems, and more specifically to a software application-based system that connects users with FAA qualified drone pilots for emergency response and surveillance purposes.

2. Description of Related Art

On-demand platform-based peer-to-peer service systems are well known in the art and are effective means to connect service providers with customers. For example, FIG. 1 depicts a conventional peer-to-peer ride-sharing service 101 having a software application 103 that connects riders 105 with drivers 107 based on geographical proximity.

However, one of the limitations associated with such systems, including system 101, is their confinement to specific service types, such as ground-based transportation in the case of ride-sharing services. For example, system 101 does not cater to needs that fall outside its specific service scope, such as aerial surveillance and response in emergency situations, particularly those involving potential criminal activity. This leaves customers reliant on public emergency response services, which may not always be able to respond in a timely or effective manner and can bring introduce new complications into a situation.

Furthermore, conventional systems do not leverage the potential of emerging technologies, such as drone technology, which could provide real-time video recording and surveillance. This additional feature could significantly enhance the safety and security of customers, addressing needs that are currently unmet by existing peer-to-peer service platforms.

Accordingly, although great strides have been made in the area of software application-based service systems, many shortcomings remain. It is therefore an objective of the present invention to provide a system that connects users with drone pilots for the purpose of emergency response and surveillance, thereby addressing the limitations of current systems and enhancing public safety.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
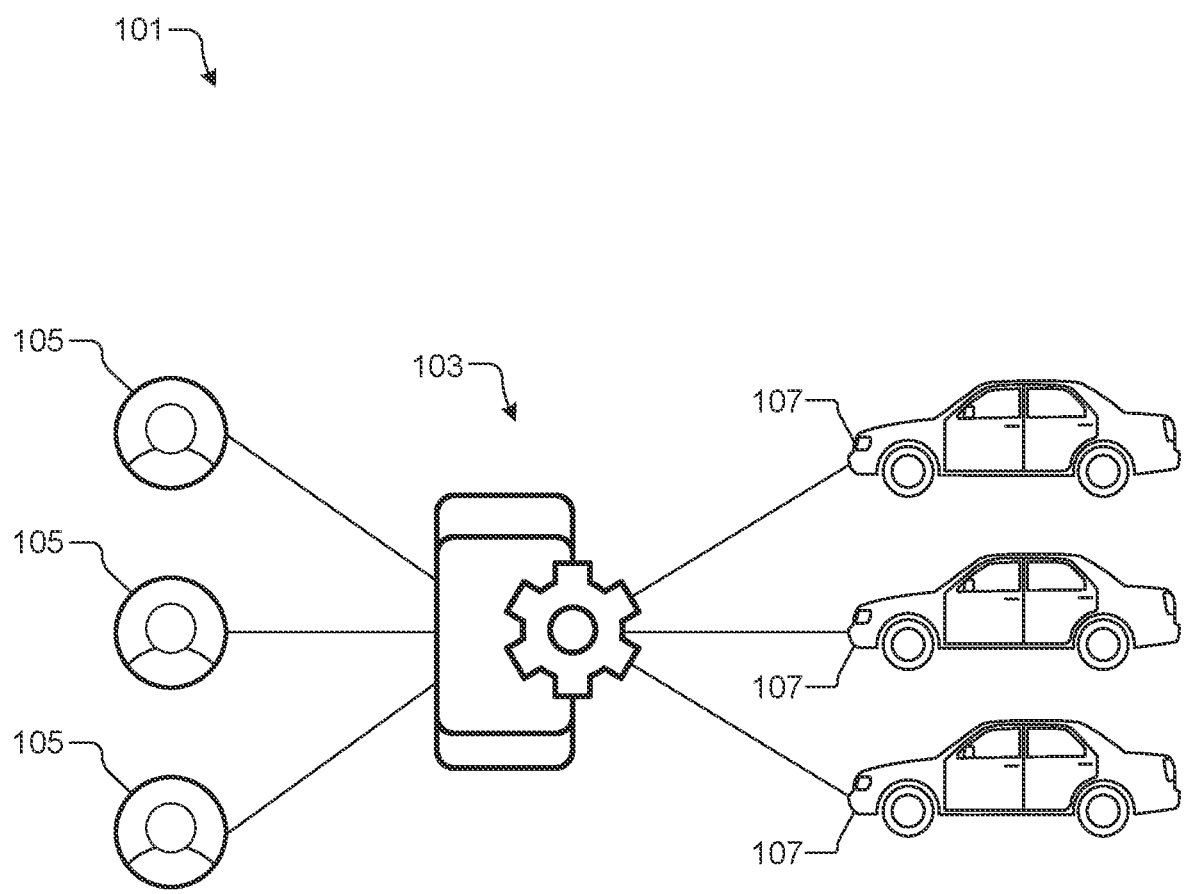
FIG. 1 is a diagram depicting a prior art peer-to-peer ridesharing service.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional platform-based peer-to-peer service systems. Specifically, the system of the present invention provides peer-to-peer on-demand drone surveillance and emergency response services, connecting users with FAA licensed drone pilots and enabling real-time video recording and surveillance in emergency situations. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
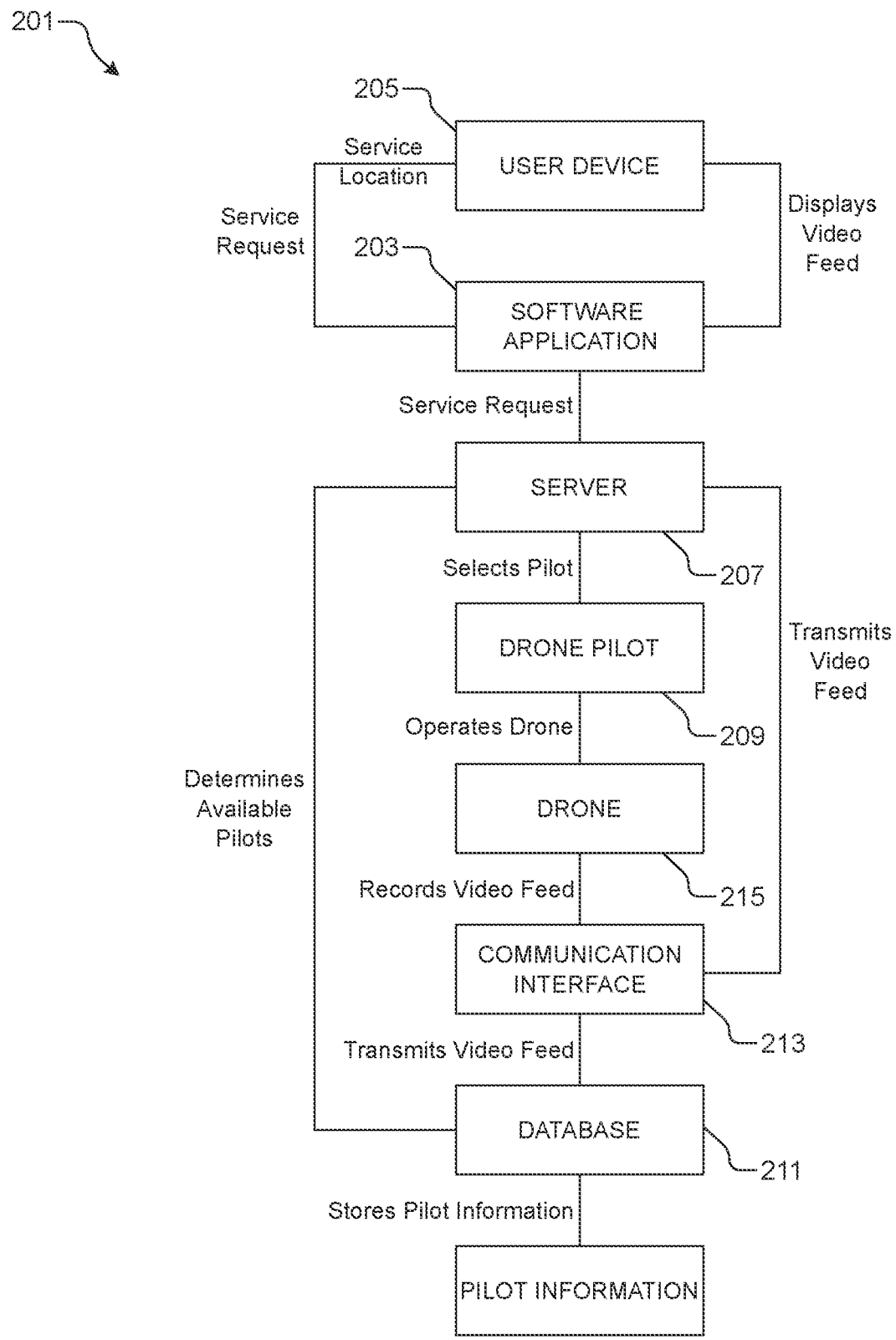
FIG. 2 is a schematic diagram of a preferred embodiment of the system for on-demand drone surveillance and emergency response of the present application.
Figure 3:
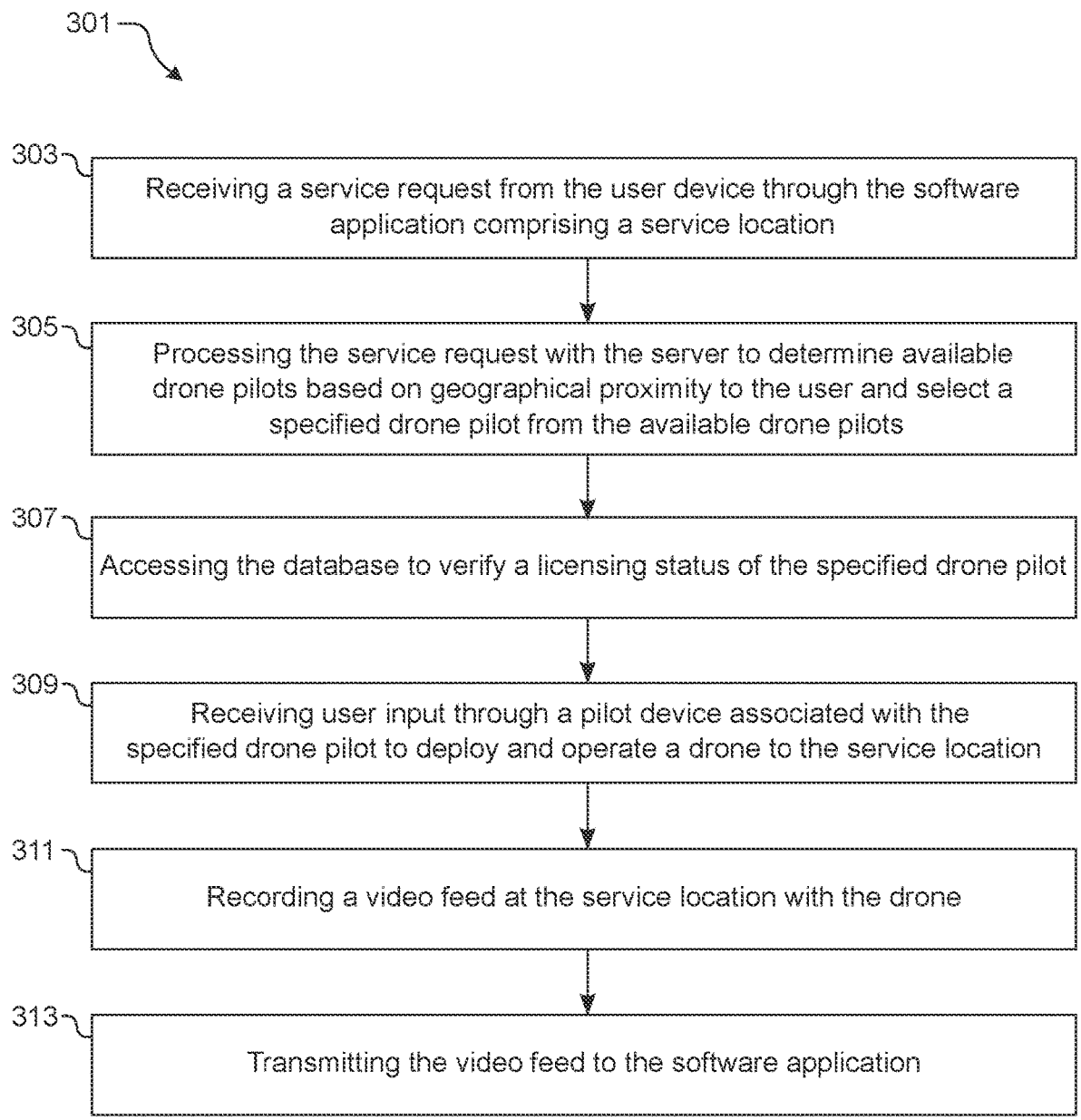
FIG. 3 is a flow diagram depicting a method of a preferred embodiment of the method for on-demand drone surveillance and emergency response of the present application.

Referring now to the drawings wherein like reference characters identify corresponding or similar elements throughout the several views, FIGS. 2-3 depict a schematic system diagram and a method for on-demand drone surveillance and emergency response in accordance with a preferred embodiment of the present application. It will be appreciated that the system 201 overcomes one or more of the above-listed problems commonly associated with conventional platform-based peer-to-peer service systems. In addition, it should be appreciated that more or fewer of such components may be included in different embodiments of the system.

It is the primary intent of the present invention to provide a service for responding to emergency situations, potential criminal activity, and the like. However, it is further contemplated that the system and method of the present invention may be similarly implemented for any other suitable purpose in various configurations and embodiments in accordance with the spirit and scope of the present disclosure.

In the contemplated embodiment, the system 201 of the present invention comprises a software application 203 configured to receive a service request from a user device 205 corresponding to a service location, a server 207 configured to process the service request and determine available drone pilots to respond to the service request, and a database 211 configured to store information related to the drone pilots. The software application 203 is preferably a mobile application, though the software application 203 may alternatively or additionally comprise a desktop application of other use interface means in different embodiments.

The system 201 further comprises a communication interface 213 and at least one drone 215 equipped with video recording and wireless data transfer capabilities and configured to respond to the service location and record a video feed at the service location. In the present disclosure, a drone should be understood to refer to any type of unmanned aerial vehicle (UAV) or aircraft whose features and configuration is suitable to the spirit and purpose of the present invention, such as, but not limited to, a quadrotor or other multirotor or helicopter configuration, winged aircraft, jet propelled aircraft, or other UAV configurations capable of maintaining continuous close visual surveillance of a location.

The communication interface 213 of the present invention is configured to transmit the video feed from the drone 215 to the user's software application 203 and, in some instances, to third parties such as local law enforcement agencies. This allows for real-time monitoring of the situation and immediate response by authorities or other official emergency personnel if required.

In the contemplated embodiment, the various components of the system 201 may communicate with each other through any combination of wired and wireless communication protocols to ensure seamless and efficient operation. The user device 205 communicates with the software application 203 through a frontend user interface, which in turn communicates with the server 207 via a secure internet connection. The server 207, acting as the central hub of the system 201, communicates with the database 211 to retrieve and store information, and with the drone pilots' 209 devices to dispatch service requests. The drones 215 communicate with the server 207 and the pilots' 209 devices through wireless data links, transmitting live video feeds and receiving operational commands. The communication interface 213 ensures that the video feed captured by the drone 215 is securely and reliably transmitted to the user device 205 and, if necessary, to local law enforcement agencies.

In the contemplated embodiment, the system 201 of the present invention incorporates a plurality of drones 215, distributed across a service area, each ready to be operated by one of a plurality of drone pilots 209. In some embodiments, each drone pilot 209 may be associated with a specific drone 215, such as in the case of pilots registering with the system 201 to provide their piloting services using their own drone. In some embodiments, a fleet of drones 215 may be provided and managed by an administrative entity, and any pilot 209 may be matched with a drone 215 in closest geographical proximity to the service location, whereby the pilot 209 controls the drone 215 communicating through the system 201 of the present invention.

The server 207 queries the database 211 and/or other available data sources for available pilots based on geographical proximity to the user and selects a specified drone pilot 209 from the available drone pilots. The drone selection process may additionally or alternatively incorporate other attributes or information, such as selection or acceptance from the user and/or pilot, service type, drone configuration, local drone regulations, or other factors.

Once selected, the drone 215 is deployed to the service location, operated by the specified drone pilot 209. The drone 215 is equipped with video recording capabilities and is configured to record a video feed at the service location.

The software application 203 is further configured to track a GPS location of the user device 205 in order to guide the drone 215 to the service location. This ensures that the drone 215 is able to accurately locate the user in an emergency situation.

In the contemplated embodiment, the database 211 is further configured to verify one or more status attributes of the specified drone pilot 209 or the available drone pilots, or the status attributes may be a prerequisite to qualify as an available drone pilot. The one or more status attributes may comprise, but are not limited to, one or more regulatory compliance or licensing status, such as FAA licensing status and information related to compliance with local drone regulations. All pilots should be properly licensed and compliant.

It is also contemplated and will be appreciated that system 201 can incorporate additional features such as automated drone flight paths, obstacle avoidance systems, and advanced video analytics to further enhance the effectiveness and utility of the system 201.

It should also be appreciated that one of the unique features believed characteristic of the present application is that it provides a real-time, on-demand surveillance and emergency response service using drones. This allows for a rapid and effective response to emergency situations, potentially saving lives and preventing property damage.

FIG. 3 depicts a method of use 301 for the system of FIG. 2 in accordance with an embodiment of the present invention. The method 301 initiates with step 303 of receiving a service request from a user through the software application. The service request includes the service location associated with the user device, which may be provided through a GPS system of the user device or through any other suitable means.

The service request is processed by the server at 305 to determine available drone pilots based on geographical proximity to the user. A specified drone pilot is then selected from the available drone pilots.

In step 307, the database is accessed to verify the licensing status of the specified drone pilot. In step 309, user input is received through a pilot device associated with the specified drone pilot in order to deploy and operate the drone to the service location.

Finally, the method 301 includes with a step 311 of recording a video feed at the service location and transmitting the video feed at step 313. This is accomplished through a communication interface, which transmits the video feed from the drone to the user's software application and, if configured to do so, to local law enforcement agencies. The video feed is also transmitted to and stored in the database for future reference, analysis, or evidence purposes or other purposes.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for on-demand drone surveillance and emergency response comprising:
 a software application configured to receive a service request from a user device corresponding to a service location;
 a server configured to process the service request and determine available drone pilots based on geographical proximity to the user and select a specified drone pilot from the available drone pilots;
 a database configured to store information related to the drone pilots;
 a drone equipped with video recording capability, operated by the specified drone pilot, configured to respond to the service location and record a video feed at the service location;
 a communication interface configured to transmit the video feed; and
 a remote user device configured to receive the video feed form the communication interface, the remote user device includes a GPS location device;
 wherein the software application is further configured to track a GPS location of the user device in order to guide the drone to the service location; and
 wherein the remote user device provides a live video feed from the drone.

2. The system for on-demand drone surveillance and emergency response as claimed in claim 1, wherein the information related to the drone pilots includes FAA licensing status and compliance with local drone regulations.

3. The system for on-demand drone surveillance and emergency response as claimed in claim 1, wherein the video feed is recorded to the database.

4. The system for on-demand drone surveillance and emergency response as claimed in claim 1, wherein the software application is further configured to communicate with at least one local law enforcement agency.

5. A method for on-demand drone surveillance and emergency response, comprising the steps of:
 providing the system of claim 1;
 receiving a service request from the user device through the software application, the service request comprising a service location associated with the user device;
 processing the service request with the server to determine available drone pilots based on geographical proximity to the user and select a specified drone pilot from the available drone pilots;
 accessing the database to verify a licensing status of the specified drone pilot;
 receiving user input through a pilot device associated with the specified drone pilot to deploy and operate a drone to the service location; and
 recording a video feed at the service location with the drone.

* * * * *